United States Patent
Pascheka et al.

(10) Patent No.: US 9,878,714 B2
(45) Date of Patent: Jan. 30, 2018

(54) APPARATUS AND METHOD FOR ACCELERATION OF A VEHICLE

(71) Applicant: VOLKSWAGEN AG, Wolfsburg (DE)

(72) Inventors: Patrick Pascheka, En Den Haag (NL); Sandra Kleinau, Rötgesbüttel (DE)

(73) Assignee: Volkswagen AG, Wolfsburg (DE)

( * ) Notice: Subject to any disclaimer, the term of this patent is extended or adjusted under 35 U.S.C. 154(b) by 43 days.

(21) Appl. No.: 15/040,684

(22) Filed: Feb. 10, 2016

(65) Prior Publication Data

US 2016/0229409 A1 Aug. 11, 2016

(30) Foreign Application Priority Data

Feb. 11, 2015 (DE) .................. 10 2015 202 451

(51) Int. Cl.
*B60W 30/00* (2006.01)
*B60W 40/00* (2006.01)
*G08G 1/00* (2006.01)
*B60W 50/00* (2006.01)
*B60W 30/18* (2012.01)
*B60W 30/165* (2012.01)

(Continued)

(52) U.S. Cl.
CPC .... *B60W 30/18154* (2013.01); *B60W 30/165* (2013.01); *B60W 30/18027* (2013.01); *B60W 30/18145* (2013.01); *B60W 40/04* (2013.01); *B60W 50/0097* (2013.01); *G08G 1/09623* (2013.01); *G08G 1/09626* (2013.01); *G08G 1/096725* (2013.01); *G08G 1/096783* (2013.01); *G08G 1/096791* (2013.01); *G08G 1/22* (2013.01); *B60W 2550/22* (2013.01); *B60W 2550/306* (2013.01); *B60W 2720/106* (2013.01)

(58) Field of Classification Search
CPC ...... B60W 30/00; B60W 40/00; B60W 50/00; G08G 1/00
See application file for complete search history.

(56) References Cited

U.S. PATENT DOCUMENTS 6,989,766 B2 * 1/2006 Mese ............... G08G 1/096716 340/907
8,478,500 B1 * 7/2013 Vahidi ....................... B60T 7/18 340/932

(Continued)

FOREIGN PATENT DOCUMENTS

DE 102008035992 A1 3/2009
DE 102009042923 A1 8/2011

(Continued)

OTHER PUBLICATIONS

Search Report for German Patent Application No. 10 2015 202 451.2; dated Oct. 30, 2015.

*Primary Examiner* — Yonel Beaulieu
(74) *Attorney, Agent, or Firm* — Barnes & Thornburg LLP

(57) ABSTRACT

Devices, systems, and methods for accelerating a vehicle in the case of a line start at a traffic light system can include determining a likelihood of a predefined vehicle being able to pass through the traffic light system during a current or imminent green phase, accelerating the vehicle in accordance with a signal from an electronic towbar system if the likelihood is higher than a predefined threshold value, and accelerating the vehicle to a lesser extent if the likelihood is lower than the predefined threshold value.

12 Claims, 2 Drawing Sheets

(51) Int. Cl.
*B60W 40/04* (2006.01)
*G08G 1/0967* (2006.01)
*G08G 1/0962* (2006.01)

(56) References Cited

U.S. PATENT DOCUMENTS

| | | | |
|---|---|---|---|
| 8,996,286 B1* | 3/2015 | Klein | G01C 21/3415 |
| | | | 701/117 |
| 9,262,918 B2* | 2/2016 | Otake | G08G 1/095 |
| 9,558,666 B2* | 1/2017 | Jansson | G08G 1/164 |
| 9,564,049 B2* | 2/2017 | Diba | G08G 1/087 |
| 9,564,050 B2* | 2/2017 | Krijger | G08G 1/0129 |
| 2005/0134478 A1* | 6/2005 | Mese | G08G 1/096716 |
| | | | 340/901 |
| 2015/0134232 A1* | 5/2015 | Robinson | G08G 1/0116 |
| | | | 701/117 |

FOREIGN PATENT DOCUMENTS

| | | |
|---|---|---|
| DE | 102011081609 A1 | 2/2013 |
| DE | 102011082336 A1 | 3/2013 |
| DE | 102012202110 A1 | 8/2013 |
| DE | 102012210069 A1 | 12/2013 |
| DE | 112012001799 T5 | 1/2014 |
| DE | 102014203988 A1 | 9/2014 |
| WO | 2013034729 A1 | 3/2013 |

* cited by examiner

APPARATUS AND METHOD FOR ACCELERATION OF A VEHICLE

PRIORITY CLAIM

This patent application claims priority to German Patent Application No. 10 2015 202 451.2, filed 11 Feb. 2015, the disclosure of which is incorporated herein by reference in its entirety.

SUMMARY

Illustrative embodiments relate to a means of transport, an apparatus and a method for accelerating a vehicle when starting at a traffic light system. In particular, disclosed embodiments relate to a way of starting a vehicle at traffic lights as comfortably and energy-efficiently as possible using an electronic towbar system.

BACKGROUND

Distance regulation systems belong to the prior art and have become available in many vehicles. Furthermore, these systems (so-called stop-and-go systems) can sometimes decelerate to a standstill and can start again from a standstill. During automatic starting at traffic lights, the number of vehicles which cross the traffic lights during a green phase depends, inter alia, on how quickly the vehicles start. The lower the acceleration and the greater the reaction times, the fewer vehicles can pass through the traffic lights during a given green phase duration. Against this background, a so-called "electronic towbar" may be helpful since it makes it possible to (virtually) simultaneously accelerate subsequent vehicles with shortened distances, in which case the safety distances implemented by systems already in series use are considerably undershot. Precisely these safety distances result in time windows which are not used to cross the traffic light system. However, if an electronic towbar known in the prior art is applied to all of the vehicles waiting at the traffic light system, a driver whose vehicle cannot use the green phase must manually release the electronic towbar to the person in front of him and must decelerate his vehicle before passing through the traffic lights. However, his vehicle has reached a considerable speed up to this time, thus resulting in abrupt deceleration and wasted kinetic energy.

An electronic towbar may make it possible for a line of vehicles to rapidly start and to optimize the traffic flow across intersections by means of a high vehicle density. However, such a method is useful only for a particular number of vehicles: in addition to the first vehicle, the second vehicle in the line in front of traffic lights will presumably also be able to cross the traffic lights in the same green phase. However, this is doubtful at least for a tenth vehicle inside the line. If this tenth vehicle now drives behind a ninth vehicle, likewise in a manner coupled to an electronic towbar, and this ninth vehicle indeed manages to cross the traffic lights in the same green phase as the first vehicle, but the tenth vehicle does not, this results in an uncomfortable braking intervention in the tenth vehicle if it is not detected in good time that the tenth vehicle cannot pass through the traffic lights during the same green phase. Since the tenth vehicle has been unnecessarily accelerated and the kinetic energy is at best partially recuperated when stopping at the traffic lights, a moderate acceleration maneuver or "creeping" to the traffic lights would have been able to considerably reduce the energy requirement. Against this background, the disclosed embodiments provide an improved method for the line start at traffic lights.

BRIEF DESCRIPTION OF THE DRAWINGS

Exemplary embodiments are described in detail below with reference to the accompanying drawings, in which.

DETAILED DESCRIPTION OF THE DISCLOSED EMBODIMENTS

Figure 1:
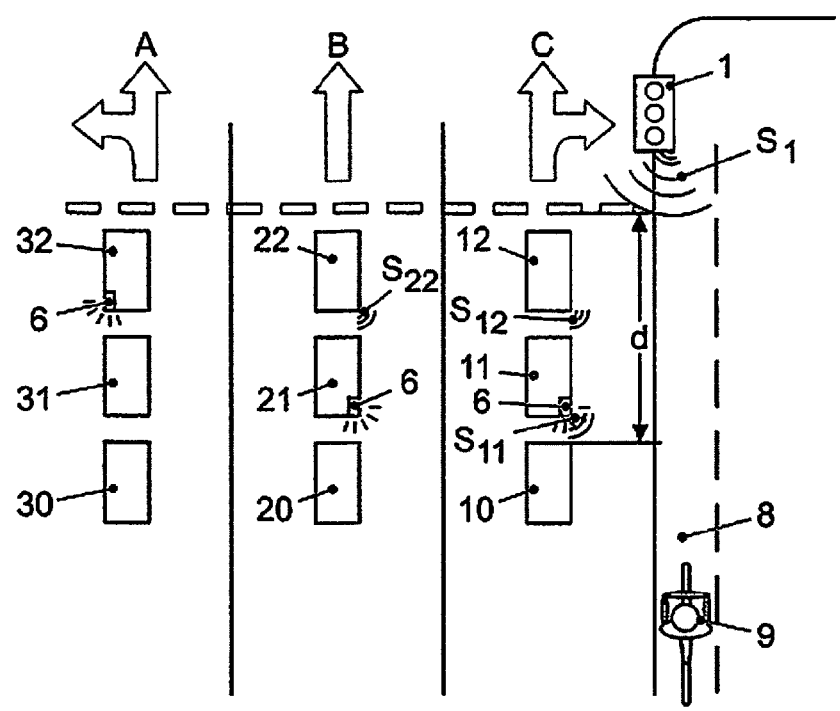
FIG. 1 is a schematic illustration of a traffic situation at a traffic light system.

Disclosed embodiments provide a method for accelerating a vehicle in the case of a line start at a traffic light system. Within the scope of the disclosed embodiments, a "line start" is understood to mean an automatically assisted, semi-automatic or fully automatic starting operation of a multiplicity of vehicles, which is carried out, in particular, with considerable undershooting of a safety distance to the person in front for the manual or sensor-based compliance. Such an automated line start can be assisted or carried out, for example, by an electronic towbar system in which driving dynamics parameters of a vehicle traveling in front are wirelessly transmitted to a subsequent vehicle to also (at least occasionally) longitudinally guide the subsequent vehicle with similar or identical driving dynamics parameters. In a first step, a likelihood of a predefined vehicle (also "ego vehicle") being able to pass through the traffic light system during a current or imminent green phase is determined. The likelihood can be determined on the basis of a distance to the traffic light system, for example. In this case, a priori knowledge of the switching times of the traffic light system can be used and/or wireless signals transmitted by the traffic light system can be evaluated in the vehicle. In a second step, the vehicle is accelerated in accordance with a signal from an electronic towbar system if the likelihood is higher than a predefined threshold value. In other words, the vehicle is guided in the direction of the traffic light system in a manner coupled via an electronic towbar. If, however, the likelihood is lower than the predefined threshold value, that is to say passage through the traffic light system in the course of a current or imminent green phase is unlikely, the vehicle is accelerated to a lesser extent and is led to the traffic light system in an energy-optimized and comfort-optimized manner.

The likelihood of a predefined vehicle being able to pass through the traffic light system during a current or imminent green phase can be determined using a multiplicity of items of possible information. These may be used individually or in combination with one another. For example, a duration to an end of the current or imminent green phase can be determined. This duration forms the basis of whether the other circumstances of the traffic situation allow successful passage through the traffic light system during the green phase. On the one hand, the distance between the predefined vehicle and the traffic light system plays a role and can be determined using sensors and/or via a wireless signal and/or via a positioning system in combination with a digital road map. The number of vehicles waiting between the predefined vehicle and the traffic light system likewise plays a role. In this case, the vehicles traveling in the same lane as the ego vehicle may be taken into account, in particular, and a characteristic variable for the number thereof may be determined or received. The signals from an environment sensor (for example an optical sensor) in the predefined vehicle may be helpful, which sensor can be used, for example, to determine the above-mentioned distance to the traffic light system (a known/standardized variable) and/or the characteristic variable for the number of waiting vehicles. Signals from an electronic towbar system of one or more vehicles waiting between the predefined vehicle and the traffic light system can also provide information on how quickly the vehicles traveling in front accelerate and how quickly it is accordingly still possible to reach the traffic light system before the imminent end of the current green phase makes it necessary to decelerate the ego vehicle. It is also possible to determine whether one of the vehicles traveling in front signals a turning intention by activating a direction indicator. Since a turning intention means pulling out of an electronic towbar assembly and sometimes causes waiting times for yielding to further road users with the right of way, the likelihood of successfully crossing the traffic light system in the current green phase can be automatically reduced to avoid unnecessary acceleration of the ego vehicle. Finally, a turning option or the permission for a turning operation in a lane traveled on by the predefined vehicle can be determined. For example, this can be carried out by detecting traffic signs by means of an optical sensor. In this manner, even without an actual turning intention by a vehicle traveling in front which has already been signaled, it is taken into account that vehicles traveling in front break out of the electronic towbar assembly for the purpose of turning and cause additional waiting times for the subsequent traffic. The turning intention and the existing turning options may likewise be determined using environment sensors in the ego vehicle and/or by evaluating wireless signals. Provided that a plurality of vehicles traveling in front transmit signals from an electronic towbar system and these signals are received by the ego vehicle, the ego vehicle can be accelerated in accordance with such a signal which represents the lowest acceleration in the case of different contents of the signals. This is carried out assuming that the likelihood of successfully passing through the traffic light system in a current or imminent traffic light cycle is higher than a predefined threshold value. This takes into account the fact that the lowest acceleration of the vehicles traveling in front is ultimately decisive for maximum acceleration of the ego vehicle if a collision is to be avoided. Alternatively, the plurality of signals from the electronic towbar system of vehicles traveling in front can be averaged to anticipate adjustment of an initially low acceleration value to a higher acceleration value and to accelerate the ego vehicle as uniformly as possible. In particular, the different accelerations can be weighted, with the result that the acceleration of a vehicle immediately traveling in front receives a higher weight than a vehicle traveling further in front. However, if the acceleration of the vehicle immediately in front of the ego vehicle exceeds the acceleration of one or more vehicles in front of that very vehicle, the lower acceleration can also be given a higher weighting. This step is also carried out assuming that the likelihood of successfully crossing the traffic light system in a current or imminent traffic light cycle is higher than the predefined threshold value.

The vehicle may be accelerated from a standstill. In other words, the disclosed method can be understood as meaning line start assistance from a standstill. For example, the disclosed method begins in such a situation in which vehicles waiting behind one another at the traffic light system are at a shortest distance from one another. The disclosed method is naturally not provided for implementing a lowest possible acceleration when approaching a traffic light signal system, but rather, if possible, assisting with a greatest possible acceleration when starting at a traffic light system for precisely the latter to be successfully crossed by as many vehicles as possible and otherwise carrying out a lower acceleration in such a manner that any subsequent traffic at least does not carry out any overtaking maneuver to gain a waiting place in front of the ego vehicle at the traffic light system. However, the intention is to achieve an energy consumption which is as low as possible and a comfortable acceleration behavior, as would be manually established by the driver of the ego vehicle even without automatic longitudinal guidance.

The duration of the current or imminent green phase can be transmitted to the ego vehicle, for example, a signal coming from the traffic light system. Alternatively or additionally, a vehicle-based database may provide information relating to the switching behavior of the traffic light system and can be used, for example in combination with an optical sensor, to detect a changeover moment of the traffic light system to estimate a new (future) changeover of the traffic light system and therefore to synchronize the information from the database.

A number of vehicles between a traffic light system and an ego vehicle in the lane currently being traveled on may be estimated in a first step. On the basis of the number of vehicles or the tailback length and the number and possibly arrangement of vehicles equipped and on the basis of the information relating to the length of a green phase of the traffic light system being approached, an assessment is then carried out to determine whether rapid starting as a first acceleration mode or normal starting as a second acceleration mode is intended to be selected. In this case, the first mode may be characterized, in particular, by the fact that the acceleration of a vehicle which is immediately traveling in front and is transmitted to the ego vehicle via an apparatus for vehicle-to-vehicle communication (V2V) is used for the pilot control of a distance regulation system and enables virtually simultaneous starting. In this manner, when the vehicle traveling in front moves off, the vehicle will automatically follow the latter, the acceleration of the ego vehicle depending on whether the first mode or the second mode is active.

A second disclosed embodiment proposes an apparatus for accelerating a vehicle at a traffic light system. The apparatus comprises an evaluation unit which may be provided as an electronic control device. The evaluation unit comprises a programmable processor and/or a nanocontroller and/or a microcontroller. A receiving unit is provided for the purpose of converting wirelessly received signals from another vehicle and/or from a traffic light system. The receiving unit may also comprise an optical sensor which can be used to capture and evaluate signals from a direction indicator of a vehicle in front and/or traffic signs and/or corresponding traffic light systems for the purpose of determining turning options. Finally, an actuator which is set up to longitudinally guide the means of transport is also provided. The evaluation unit is set up to evaluate signals received via the receiving unit and to determine a likelihood of a predefined vehicle being able to pass through the traffic light system during a current or imminent green phase. The manner in which the actuator controls the longitudinal guidance (acceleration behavior) of the ego vehicle corresponds to that which has already been described in connection with the disclosed method. Accordingly, the actuator guides the vehicle in accordance with a signal from an electronic towbar system for the case of a high likelihood of successfully crossing the traffic light system during a current green phase and increases the user comfort and reduces the energy requirement for longitudinally guiding the vehicle for the case of a low likelihood of crossing the traffic light system.

The receiving unit may be set up to determine the likelihood of determining a duration until an end of the current or imminent green phase and/or to determine a distance between the predefined vehicle and the traffic light system and/or a characteristic variable for a number of vehicles waiting between the predefined vehicle and the traffic light system. Alternatively or additionally, the receiving unit may evaluate a signal from an environment sensor in the predefined vehicle and/or a signal from an electronic towbar system of one or more vehicles waiting between the predefined vehicle and the traffic light system. Alternatively or additionally, the receiving unit may be set up to determine a turning intention of a vehicle between the predefined vehicle and the traffic light system and alternatively or additionally to determine turning options in a lane currently being traveled on by the predefined vehicle. As stated in connection with the disclosed method, the existing turning options in a lane currently being traveled on by the predefined vehicle may be taken into account when evaluating a turning intention (for example indicated by means of a direction indicator) of a vehicle waiting between the traffic light system and the predefined vehicle. In particular, for the situation in which the turning intention indicates a maneuver which is not provided/allowed for the current lane, provision is made for it to be assumed that the driver of the vehicle traveling in front will quickly realize his mistake with the turning wish, will abort the turning intention and will therefore remain in the electronic towbar assembly.

A third disclosed embodiment proposes a computer program product comprising instructions which, when executed on a programmable evaluation unit of an apparatus according to the second disclosed embodiment, cause the evaluation unit to carry out the steps of a method according to the first disclosed embodiment. The computer program product may be a CD, a DVD, a Blu-ray disc, a flash memory, a hard disk, RAM/ROM, a cache etc.

A fourth disclosed embodiment proposes a signal sequence representing instructions which, when executed on a programmable evaluation unit of an apparatus according to the second disclosed embodiment, cause the evaluation unit to carry out the steps of a method according to the first disclosed embodiment. In this manner, the provision of the instructions using information technology is protected for the situation in which the storage means required for this purpose are outside the scope of the accompanying claims.

FIG. 1 shows an exemplary scenario in which the disclosed method can be used. Two vehicles 11, 12 which are each equipped with an apparatus for vehicle-to-vehicle communication and are equipped to carry out a line start using an electronic towbar are situated immediately in front of the ego vehicle 10 in the lane C. For this purpose, the vehicle 11 transmits a wireless signal S11 and the vehicle 12 transmits a wireless signal S12 to the ego vehicle 10. The vehicle 11 also uses a direction indicator 6 to indicate that it intends to carry out a (permitted) turning operation to the right. A distance d exists between the traffic light system 1 and the ego vehicle 10 and is determined using an environment sensor (not illustrated) and with the aid of a positioning solution in combination with a digital road map in the ego vehicle 10. A wireless signal S1 from the traffic light system 1 informs the vehicles 10, 11, 12, 20, 21, 22, 30, 31, 32 when the next green phase will start and when it will end. The imminent turning intention of the vehicle 11 reduces the likelihood of the vehicle 10 being able to use the imminent green phase since a cyclist 9 approaching in a cycle lane 8 has right of way over the vehicle 11 and therefore causes a certain waiting time until the vehicle 11 successfully turns. Only driving straight ahead is provided and allowed in a middle lane B. Accordingly, a vehicle 20 can assume that the vehicle 21 will adjust the turning wish declared using the direction indicator 6 in good time and will continue to drive straight ahead. Only the first vehicle 22 waiting in the lane B transmits an electronic towbar signal S22 to the subsequent vehicles 20, 21, with the result that only the vehicle 21 can be reliably coupled to the vehicle 22. Such coupling already does not come into question for the vehicle 20 since the vehicle 21 could sever the coupling on account of the turning wish, for example, and could therefore require a lower acceleration than the vehicle 22. The vehicles 30, 31, 32 do not interchange any wireless signals from an electronic towbar system and must presumably accept a considerable waiting time on account of the turning wish of the vehicle 32, which makes successful passage through the traffic light system 1 unlikely.

Figure 2:
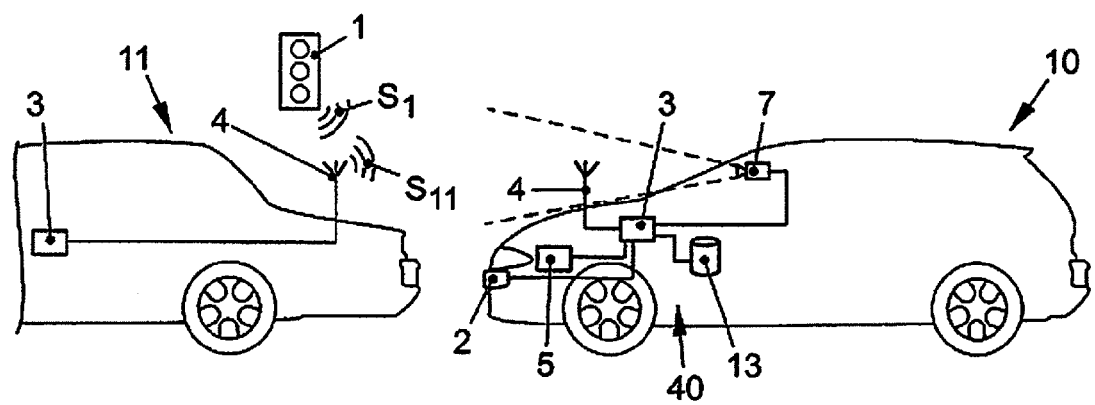
FIG. 2 is a schematic illustration of two vehicles during a line start at a traffic light system, components of the disclosed apparatus being illustrated.

FIG. 2 shows components of an automobile 10 configured according to the disclosed embodiment as a means of transport and of an automobile 11 traveling in front which emits wireless signals S11 generated by an evaluation unit 3 and via a wireless transmitting unit 4 to the automobile 10 to make it possible for the latter to activate an electronic towbar. In this case, the wireless signal S11 may comprise, in particular, a planned and/or current acceleration of the transmitting vehicle 11. A traffic light system 1 transmits wireless signals S1 to both automobiles 10, 11 to inform the latter of the period of an imminent green phase. The apparatus 40 for accelerating the automobile 10 comprises an evaluation unit 3, particularly, an electronic control device, which receives and evaluates the signals from an optical front camera 7, a wireless receiving unit 4 and an environment sensor 2. An electronic data memory 13 is connected to the evaluation unit 3 to keep available the computer program code for carrying out the disclosed method and to enable heuristic investigations of a switching behavior of the traffic light system 1 by means of stored data. An actuator 5 is coupled to a drive unit (not illustrated) for longitudinally accelerating the automobile 10, which drive unit can be controlled by the apparatus 40 provided that the driver wishes to participate in the electronic towbar or such participation is initiated from another side.

Figure 3:
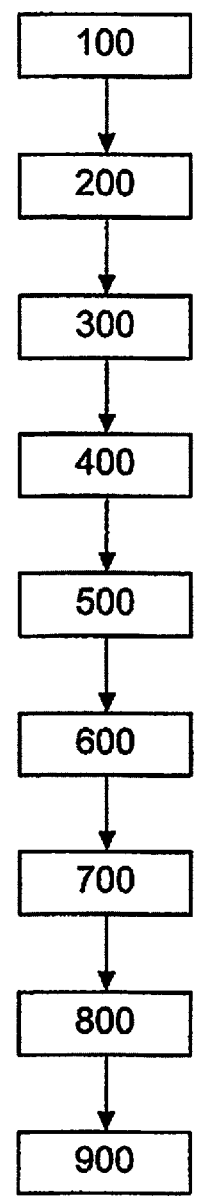
FIG. 3 is a flowchart illustrating steps of an exemplary embodiment of the disclosed method.

FIG. 3 shows steps of an exemplary embodiment of the disclosed method for accelerating a vehicle in the case of a line start at a traffic light system. In step 100, a likelihood of a predefined vehicle being able to pass through the traffic light system during a current or imminent green phase is determined. For this purpose, a duration until an end of the current or imminent green phase is determined in step 200. In step 300, a distance between the predefined vehicle (ego vehicle) and the traffic light system is determined. In step 400, a characteristic variable of a number of vehicles waiting between the predefined vehicle and the traffic light system is determined. The characteristic variable may be, for example, the number itself or a characteristic variable representing the waiting vehicles with respect to a duration until the predefined vehicle reaches the traffic light system. In step 500, a signal from an environment sensor in the predefined vehicle is evaluated. An actual start of a green phase can be detected using this signal and a value which corresponds to a current time of day, is stored in the means of transport and represents the duration or end of the green phase can be read out. In step 600, a signal from an electronic towbar system of one or more vehicles waiting between the predefined vehicle and the traffic light system is evaluated. On the basis of an acceleration represented by the signal, it is possible to determine whether rapid starting of the vehicles traveling in front makes it seem likely that the green phase is passed through before it ends. In step 700, a turning intention of a vehicle between the predefined vehicle and the traffic light system is determined using its direction indicator, and turning options in a lane currently being traveled on by the predefined vehicle are determined in step 800. The last two findings can be combined with one another to the effect that, in the case of a permitted turning maneuver, a higher likelihood of the driver of the relevant vehicle keeping to his turning wish is estimated. In step 900, the ego vehicle is accelerated in accordance with a signal from an electronic towbar system if the likelihood is higher than a predefined threshold value and is accelerated to an accordingly lesser extent if the likelihood is lower than the predefined threshold value.

The number of vehicles in front of the ego vehicle can be determined in a first step. For this purpose, an estimation which is based on a determined tailback length in front of the traffic light system and an average vehicle length with stopping distances (for example 6 m) can be carried out, for example. During this, the current position of the ego vehicle for example, which can be determined by means of satellite-based positioning for example, can be compared with the position of the traffic light system which is either known from a digital road map or has been transmitted by V2X communication. For this purpose, it is first of all determined that the front of the ego vehicle is at a distance of approximately 20 m from the traffic light system or a stop line associated with the latter. A number of three vehicles in front of the ego vehicle is estimated by means of comparison with a known, average vehicle length of 6 m, for example. As a result of the use of an average vehicle length, the number of vehicles may be overestimated if a truck is present. However, since a truck generally starts more slowly than an automobile, the overestimation of the number of vehicles will not become very noticeable. The information that a vehicle which is equipped with an apparatus for vehicle-to-vehicle communication is in front of the ego vehicle in the vehicle's own lane is then received. Accordingly, in a third step, an assessment is carried out to determine whether rapid starting or normal starting appears to be expedient. For this purpose, a time value representing the likely time until the traffic light system is passed through is first of all determined. In this case, this time value can be determined, for example, by taking a predetermined value from a table on the basis of a number of communicating vehicles in front of the ego vehicle and a number of non-communicating vehicles in front of the ego vehicle which are waiting at the traffic light system. This time value for the likely duration until the ego vehicle passes through the traffic light system is then compared with a value for the likely duration of the green phase of the traffic light system, which is transmitted by the traffic light system to the communicating vehicles waiting at it by means of wireless communication, for example. Alternatively, the corresponding values can also be provided via a back-end server. Depending on the number of communicating vehicles, the number of electronic towbars and accordingly the number of vehicles starting at a distance from one another in a conventional manner can also be determined and used as the basis for the time value for reaching the traffic light system. On the basis of the comparison described above, it is now determined whether a first mode or a second mode is intended to be selected for starting. In this case, the first mode may be selected when the likely duration until passing through the traffic light system is shorter than the likely duration of the green phase. In contrast, if the likely duration until passing through the traffic light system exceeds the likely duration until the end of the green phase, a second mode (normal starting) is selected.

In a further step, starting from a standstill is carried out with the aid of a distance regulation system on the basis of the fact of whether the first or the second mode is active. If the first mode is active, a distance regulation system can be made more responsive by means of two different measures for example, namely by increasing a proportionality of the acceleration of the ego vehicle to a speed difference from the vehicle traveling in front in comparison with the normal acceleration value and/or by increasing a proportionality of the acceleration of the ego vehicle to a deviation of the distance to a vehicle traveling in front from a desired distance to a vehicle traveling in front in comparison with the normal acceleration value and/or by using an acceleration of a vehicle which is immediately traveling in front and (also) has an apparatus for vehicle-to-vehicle communication for the pilot control of the acceleration of the ego vehicle. In at least one disclosed embodiment, it is possible to choose between three types of acceleration, in which case, in addition to the first mode ("rapid starting") and the second mode ("normal starting"), a third mode ("slow starting") is available, this third mode being selected when a likely time for reaching the traffic light system considerably exceeds the likely time of the green phase, and this third mode being characterized by the fact that a responsiveness of the distance regulation system is reduced, namely, for example, by reducing a proportionality of the acceleration of the ego vehicle to a speed difference from the vehicle traveling in front in comparison with the normal mode and/or by reducing a proportionality of the acceleration of the ego vehicle to a deviation of the distance to a vehicle traveling in front from a desired distance to a vehicle traveling in front in comparison with the normal mode. Alternatively or additionally, a distance regulation system can also be adapted to a traffic situation in an infinitely variable manner, rather than in a stepwise manner, on the basis of the assessment of a tailback in front of a traffic light system.

Disclosed embodiments increase the acceptance of automatic starting at traffic lights. In addition, the traffic efficiency can be increased by virtue of the fact that the number of vehicles which pass through the traffic lights on green can be increased by means of rapid starting from a standstill at a traffic light system. In this case, it is taken into account whether passage through the traffic lights can be expected during the current green phase and a more responsive starting mode, which can use, for example, an acceleration of a communicating vehicle traveling in front for the pilot control of the distance regulation system, is selected only in this case. In contrast, if it cannot be expected that the ego vehicle will pass through the traffic light system during the current green phase, such a responsive starting mode is not selected and unnecessary acceleration and braking peaks which have a negative effect on comfort and energy requirement and do not have an effect on the traffic efficiency are avoided. In addition, the method described can increase the acceptance of automatic starting at traffic lights.

Even though the concept has been described in detail using the exemplary embodiments explained in conjunction with the accompanying figures of the drawing, modifications and combinations of features of the illustrated exemplary embodiments are possible for a person skilled in the art without departing from the scope of the concept, the scope of protection of which is defined by the accompanying claims.

Distance regulation systems belong to the prior art and have become available in many vehicles. Furthermore, these systems (so-called stop-and-go systems) can sometimes decelerate to a standstill and can start again from a standstill. During automatic starting at traffic lights, the number of vehicles which cross the traffic lights during a green phase depends, inter alia, on how quickly the vehicles start. The lower the acceleration and the greater the reaction times, the fewer vehicles can pass through the traffic lights during a given green phase duration. Against this background, a so-called "electronic towbar" may be helpful since it makes it possible to (virtually) simultaneously accelerate subsequent vehicles with shortened distances, in which case the safety distances implemented by systems already in series use are considerably undershot. Precisely these safety distances result in time windows which are not used to cross the traffic light system. However, if an electronic towbar known in the prior art is applied to all of the vehicles waiting at the traffic light system, a driver whose vehicle cannot use the green phase must manually release the electronic towbar to the person in front of him and must decelerate his vehicle before passing through the traffic lights. However, his vehicle has reached a considerable speed up to this time, thus resulting in abrupt deceleration and wasted kinetic energy.

DE 10 2009 042 923 A1 discloses a driver assistance system which optimizes motion parameters of a motor vehicle when approaching a traffic signal system. The current motion parameters, a remaining distance to the traffic signal system and any vehicles between the vehicle and the traffic signal system are taken into account, like their motion parameters, to approach the traffic signal system with as little acceleration as possible and therefore to achieve the best possible user comfort and lowest possible expenditure of energy resources.

DE 10 2012 202 110 A1 discloses a distance and speed regulation system for motor vehicles, in which automatic starting from a standstill and deceleration to a standstill are provided. To use the knowledge that imminent green phases cannot be used to pass through traffic lights, it is proposed that starting is carried out with high momentum only when the likelihood of the traffic lights being able to be crossed within a current or imminent cycle is comparatively high. Otherwise, it is possible to start with lower momentum to reduce the user comfort and the use of energy resources.

An electronic towbar may make it possible for a line of vehicles to rapidly start and to optimize the traffic flow across intersections by means of a high vehicle density. However, such a method is useful only for a particular number of vehicles: in addition to the first vehicle, the second vehicle in the line in front of traffic lights will presumably also be able to cross the traffic lights in the same green phase. However, this is doubtful at least for a tenth vehicle inside the line. If this tenth vehicle now drives behind a ninth vehicle, likewise in a manner coupled to an electronic towbar, and this ninth vehicle indeed manages to cross the traffic lights in the same green phase as the first vehicle, but the tenth vehicle does not, this results in an uncomfortable braking intervention in the tenth vehicle if it is not detected in good time that the tenth vehicle cannot pass through the traffic lights during the same green phase.

Since the tenth vehicle has been unnecessarily accelerated and the kinetic energy is at best partially recuperated when stopping at the traffic lights, a moderate acceleration maneuver or "creeping" to the traffic lights would have been able to considerably reduce the energy requirement. Against this background, disclosed embodiments provide an improved method for the line start at traffic lights.

LIST OF REFERENCE SYMBOLS

1 Traffic light system
2 Environment sensor
3 Evaluation unit/electronic control device
4 Transmitting/receiving unit
5 Actuator
6 Direction indicator
7 Optical camera
8 Cycle lane
9 Cyclist
10 Ego vehicle
11, 12 Third-party vehicle
13 Data memory
20, 21, 22,
30, 31, 32 Third-party vehicle
40 Apparatus
100-900 Method steps
A, B, C Lanes
d Distance between the ego vehicle and the traffic light system
$S_1$, $S_{11}$, $S_{12}$, $S_{22}$ Wireless communication signals

The invention claimed is:

1. A method for accelerating a vehicle at a traffic light system, the method comprising:
   determining a likelihood of a predefined vehicle being able to pass through the traffic light system during a current or imminent green phase;
   accelerating the vehicle in accordance with a signal from an electronic towbar system in response to the likelihood being higher than a predefined threshold value; and
   accelerating the vehicle to a lesser extent in response to the likelihood being lower than the predefined threshold value.

2. The method of claim 1, the determination of the likelihood comprising at least one of the following:
   determining a duration until an end of the current or imminent green phase;
   determining a distance between the predefined vehicle and the traffic light system;
   determining a characteristic variable for a number of vehicles waiting between the predefined vehicle and the traffic light system;
   evaluating a signal from an environment sensor in the predefined vehicle;
   evaluating a signal from the electronic towbar system of one or more vehicles waiting between the predefined vehicle and the traffic light system;
   determining a turning intention of a vehicle between the predefined vehicle and the traffic light system; and
   determining turning options in a lane currently being traveled on by the predefined vehicle.

3. The method of claim 1, the determination of the likelihood comprising:
   evaluating signals from the electronic towbar system of a plurality of vehicle or vehicles waiting between the predefined vehicle and the traffic light system, and accelerating the predefined vehicle in accordance with a signal representing a lowest acceleration among the signals if the likelihood is higher than a predefined threshold value, or accelerating the predefined vehicle in accordance with weight-averaged acceleration among the signals if the likelihood is higher than a predefined threshold value.

4. The method of claim 1, wherein the vehicle is accelerated from a standstill.

5. The method of claim 1, wherein the determination of the likelihood determines a duration of the current or imminent green phase by a signal coming from the traffic light system, and/or a vehicle-based database.

6. An apparatus for accelerating a vehicle at a traffic light system, the apparatus comprising:
   an evaluation unit;
   a receiving unit; and
   an actuator,
   wherein the evaluation unit evaluates signals received via the receiving unit and determines a likelihood of a predefined vehicle being able to pass through the traffic light system during a current or imminent green phase, and
   wherein the actuator accelerates the predefined vehicle in accordance with a signal from an electronic towbar system in response to the likelihood being higher than a predefined threshold value, and accelerates the predefined vehicle to a lesser extent in response to the likelihood being lower than the predefined threshold value.

7. The apparatus of claim 6, wherein the receiving unit:
   determines a duration until an end of the current or imminent green phase, and/or
   determines a distance between the predefined vehicle and the traffic light system, and/or
   determines a characteristic variable for a number of vehicles waiting between the predefined vehicle and the traffic light system, and/or
   evaluates a signal from an environment sensor in the predefined vehicle, and/or
   evaluates a signal from the electronic towbar system of one or more vehicles waiting between the predefined vehicle and the traffic light system, and/or
   determines a turning intention of a vehicle between the predefined vehicle and the traffic light system, and/or
   determines turning options in a lane currently being traveled on by the predefined vehicle.

8. The apparatus of claim 6, wherein the receiving unit determines turning options in a lane currently being traveled on by the predefined vehicle, and the evaluation unit evaluates a turning intention of a vehicle waiting between the traffic light system and the predefined vehicle.

9. A computer program product comprising instructions which, when executed on a programmable evaluation unit of an apparatus to cause the evaluation unit to:
   determine a likelihood of a predefined vehicle being able to pass through the traffic light system during a current or imminent green phase;
   accelerate the vehicle in accordance with a signal from an electronic towbar system in response to the likelihood being higher than a predefined threshold value; and
   accelerate the vehicle to a lesser extent in response to the likelihood being lower than the predefined threshold value.

10. A signal sequence representing instructions which, when executed on a programmable evaluation unit of an apparatus to cause the evaluation unit to:
    determine a likelihood of a predefined vehicle being able to pass through the traffic light system during a current or imminent green phase;
    accelerate the vehicle in accordance with a signal from an electronic towbar system in response to the likelihood being higher than a predefined threshold value; and
    accelerate the vehicle to a lesser extent in response to the likelihood being lower than the predefined threshold value.

11. A transportation vehicle comprising an apparatus for accelerating the transportation vehicle at a traffic light system,
    the apparatus comprising:
    an evaluation unit;
    a receiving unit; and
    an actuator,
    wherein the evaluation unit evaluates signals received via the receiving unit and determines a likelihood of a predefined vehicle being able to pass through the traffic light system during a current or imminent green phase, and
    wherein the actuator accelerates the predefined vehicle in accordance with a signal from an electronic towbar system in response to the likelihood being higher than a predefined threshold value, and accelerates the predefined vehicle to a lesser extent in response to the likelihood being lower than the predefined threshold value.

12. A system for accelerating a transport relative to a traffic system, the system comprising:
    a receiving unit adapted to receive signals;
    an evaluation unit arranged in communication with the receiving unit to receive an indication of received signals; and
    an actuator in communication with the evaluation unit and adapted to selectively adjust acceleration behavior of the transport,
    wherein the evaluation unit in adapted to determine a likelihood of a predefined vehicle being able to pass through the traffic system during a relevant green phase by evaluation of the indication from the receiving unit, and
    wherein the actuator accelerates the predefined vehicle in accordance with a signal from an electronic towbar system in response to the likelihood being higher than a predefined threshold value, and accelerates the predefined vehicle to a lesser extent in response to the likelihood being lower than the predefined threshold value.

* * * * *